United States Patent [19]

Lorenzo

[11] 4,129,362
[45] Dec. 12, 1978

[54] EYEGLASSES
[76] Inventor: Francisco Lorenzo, 1164 SW. First St., Miami, Fla. 33130
[21] Appl. No.: 755,143
[22] Filed: Dec. 29, 1976
[51] Int. Cl.$^2$ .............................................. G02C 5/14
[52] U.S. Cl. .................................. 351/123; 351/120; 351/128; 351/145; 351/156
[58] Field of Search ............... 351/119, 120, 128, 123, 351/155, 156, 145, 157, 19; 2/11, 448

[56] References Cited
U.S. PATENT DOCUMENTS

| 1,572,733 | 2/1926 | McCourt ........................... 351/123X |
| 2,659,266 | 11/1953 | Swisher ................................ 351/156 |
| 3,841,741 | 10/1974 | Vascher, Jr. ......................... 351/120 |

FOREIGN PATENT DOCUMENTS

| 363625 | 5/1906 | France ................................... 351/128 |
| 1482970 | 4/1967 | France ................................... 351/156 |
| 19311 | 9/1914 | United Kingdom ................... 351/128 |

Primary Examiner—Paul A. Sacher

[57] ABSTRACT

Eyeglass structure which includes a male and female connection of the lens holding rings of the glasses and a band connecting the temple pieces of spring or resilient material to gently grip the sides and rear of the head of a wearer to distribute the load and wherein the plane of the lens holding rings may be adjusted through a range of generally vertical planes.

5 Claims, 2 Drawing Figures

EYEGLASSES

FIELD OF THE INVENTION

This invention relates to eyeglasses and, generally, to a pair of eyeglasses which does not include the nose piece.

BACKGROUND OF THE INVENTION

As is perhaps well known, in the past there have been numerous types of eyeglasses; however, most have been characterized by nose pieces which carry the weight of the glasses on the nose of a wearer. This invention is of a pair of eyeglasses which are connected together at the conventional nose piece zone in separable male and female connection and wherein a band is provided to connect the rearwardly extending temple pieces and which band is sized to fit the head of a wearer so that the weight of the glasses is not carried on the nose or ears but, rather, is supported by the head of a wearer with the steel band gently gripping the head of a wearer in distributing the load.

It is, accordingly, an object of this invention to provide a pair of glasses which are simple in construction and which are light in weight in that the weight is not carried on the nose and ears in localized positions but, rather, wherein the load is distributed about the head of a wearer.

DESCRIPTION OF PREFERRED EMBODIMENT

Figure 1:
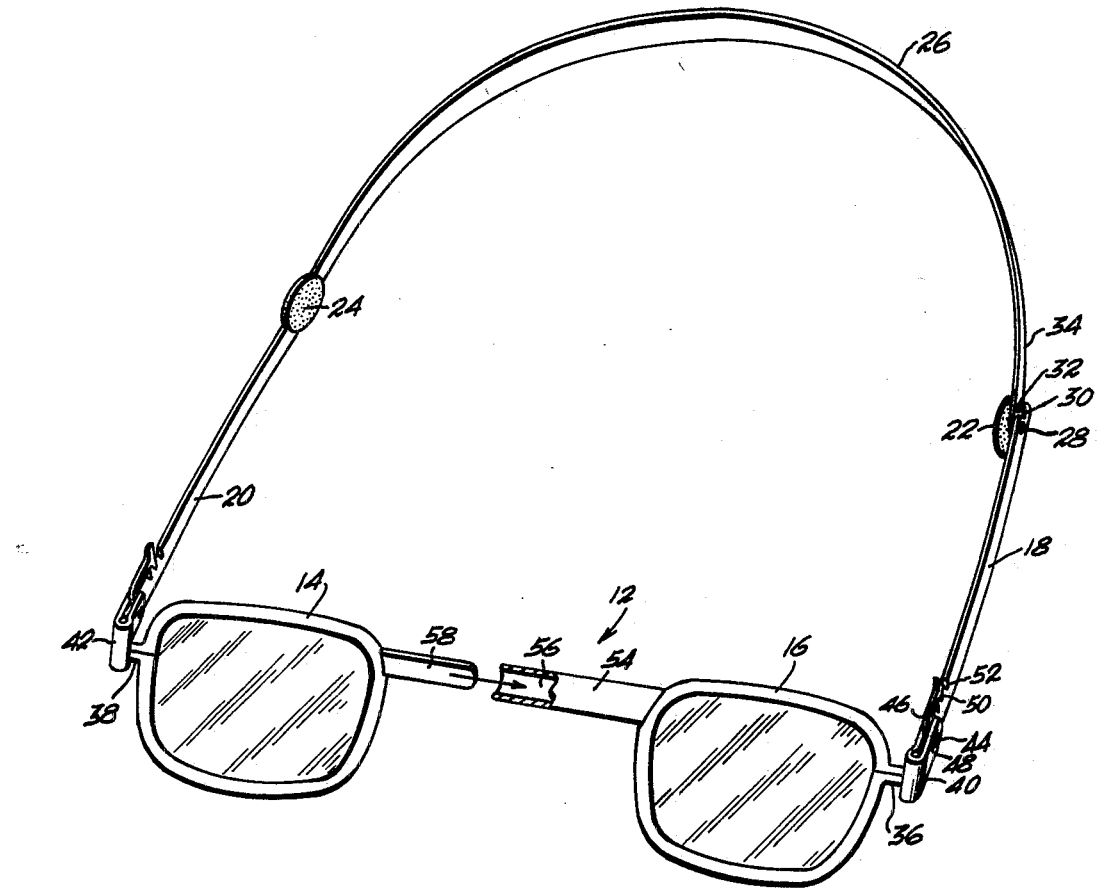
FIG. 1 is a perspective view illustrating the instant invention.
Figure 2:
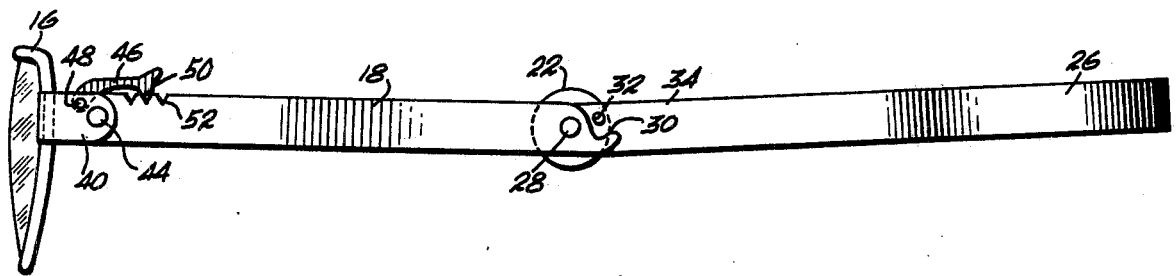
FIG. 2 is a side elevation of the invention as shown in FIG. 1.

Referring to the drawings wherein like reference characters designate like or corresponding parts throughout the several views there is shown a pair of glasses generally designated by the numeral 12 which includes a left lens holding portion 14 and a right lens holding portion 16 to each of which there is hingedly connected as at 44 a left and a right temple piece 18 and 20 respectively. Each of the temple pieces terminate at a pivot zone as at 28 which are covered interiorly by the pads or cushions designated by the same numerals 22 and 24. The pivot, reference being made to 28, connects to a rear band segment 26 which joins the terminal ends of the two temple pieces. The pivot 28 includes adjacent thereto structure 30 which interengages with a pin 32 on the ends of the band 34 to limit rotational or pivotal movement of the band segment. In the preferred embodiment the lens holding portions each include lens holding ring each with a lower portion and an upper portion which are joined together at outwardly extending portions 36 and 38 which terminate in an upstanding and downwardly extending portion which are gripped in the bight of a return hooked portion on each of the temples as designated by the numeral 40. The return portion of each is provided with a pivotal connecting keeper 46 which is pivotable as at 48 so that a terminal end which is provided with a projection 50 is adapted to engage the notches 52 as desired for tilting the eyeglass lenses through a range of generally vertical planes. The lens holding rings are joined by a nose piece which includes a male portion 58 on one which is sized to be snugly received within a female socket 56 on the other which is composed of an extension 54 from the opposite and confronting lens holding ring.

In use, the person adjusts the glasses about his head and then connects them together at the nose piece in the manner shown by the arrowed line in FIG. 1. Thereafter, he tilts the lenses to the preferred location and locks them in position by hooking up the projection 50 with the notch 52. Thereafter, he may swing them into and out of covering relation of his line of sight by pivotal movement about the pivots through 22 and 24 pads as at 28.

It is noted that there is no nose piece required and that the weight is carried by the band formed when the glasses are connected together as indicated in FIG. 1. The band is relatively thin, is of spring-type steel, preferably, and is bowed so as to slightly grip the rear of a wearer's head with the inward pressure being distributed by means of the cushions or pads 22 and 24. Hence, there is no weight on the nose or the ears and the band may be disguised by flipping it under the hair of a wearer. There is no need to touch the glasses when in position and the size of the head band may be varied to suit the wearer's head.

What is claimed is:

1. Eyeglass structure including a first and a second lens holding ring and a lens in each ring, said lens holding rings each including a portion extending toward the other lens holding ring and comprising mutually intercooperating means for interconnection in male and female relationship above the nose level of a wearer, and a pair of temple pieces, each temple piece being pivotally connected to the lens holding rings and each terminating at a distal end zone and a band segment of spring material having a first end connected to the distal end zone of one of the temple pieces and a second end connected to the distal end zone of the other of the temple pieces at a pivotal connection, said band segment being sized to fit snugly about the head of a wearer to distribute the entire weight of the eyeglass structure to the head and not to the ears and nose, and cushions connected at the juncture of the band segment and temple pieces and confronting one another for distributing tension loads by the band segment.

2. The device as set forth in claim 1 wherein means are provided to limit rotational movement of the band segment relative to the distal ends of the temple pieces.

3. The device as set forth in claim 2 wherein the lens holding rings are connected to the temple pieces at a pivotal connection adapting the same for limited range of movement through generally vertical planes of adjustment.

4. The device as set forth in claim 3 wherein keeper means are provided to fix the plane selected for the lens holding rings.

5. The device as set forth in claim 4 wherein the keeper means comprises a lever pivotally carried on the lens holding rings and engageable in notches provided on the temple pieces.

* * * * *